(12) United States Patent
Helland

(10) Patent No.: US 6,958,004 B2
(45) Date of Patent: Oct. 25, 2005

(54) SAW GRINDING APPARATUS WITH IMPROVED WEAR PLATES

(76) Inventor: Randy Helland, 621 South St., Cornell, WI (US) 54732

( * ) Notice: Subject to any disclaimer, the term of this patent is extended or adjusted under 35 U.S.C. 154(b) by 0 days.

(21) Appl. No.: 10/951,233

(22) Filed: Sep. 27, 2004

(65) Prior Publication Data

US 2005/0101234 A1    May 12, 2005

Related U.S. Application Data

(60) Provisional application No. 60/507,380, filed on Sep. 30, 2003.

(51) Int. Cl.[7] ............................................. B24B 3/36
(52) U.S. Cl. ....................... 451/48; 451/359; 451/439
(58) Field of Search ......................... 451/48, 359, 349, 451/439, 160

(56) References Cited

U.S. PATENT DOCUMENTS

| | | | |
|---|---|---|---|
| 1,146,705 A | * 7/1915 | Henry | 76/40 |
| 1,456,402 A | * 5/1923 | Ramsey | 76/37 |
| 2,076,916 A | * 4/1937 | Perkins | 76/41 |
| 2,249,743 A | * 7/1941 | Bucknam | 76/37 |
| 2,439,279 A | * 4/1948 | Andrus | 76/37 |
| 2,651,219 A | * 9/1953 | Tower et al. | 76/37 |
| 2,709,378 A | * 5/1955 | Risor | 76/37 |
| 3,880,019 A | * 4/1975 | Young | 76/37 |
| 5,142,946 A | * 9/1992 | Fappas et al. | 76/37 |

* cited by examiner

*Primary Examiner*—Robert A. Rose
(74) *Attorney, Agent, or Firm*—Godfrey & Kahn, S.C.

(57) ABSTRACT

A saw grinder having improved wear plates for allowing the saw grinder carriage to move without having to overcome the resistance caused by contact of the saw grinder wear plates with the peripheral edge of a saw blade. The wear plates form two separate wear plate assemblies, each having a slide plate and fixed plate containing a slot for slidably receiving the respective slide plate. This configuration permits the entire saw grinder, except the slide plates, to easily move in the direction of the force applied to the grinder carriage by allowing the slide plates to fixedly engage the peripheral edge of the saw while the fixed plates remain fixed to the saw grinder carriage and thus move therewith. Resilient members can be used to control the relative movement between the fixed plates and slide plates.

20 Claims, 6 Drawing Sheets

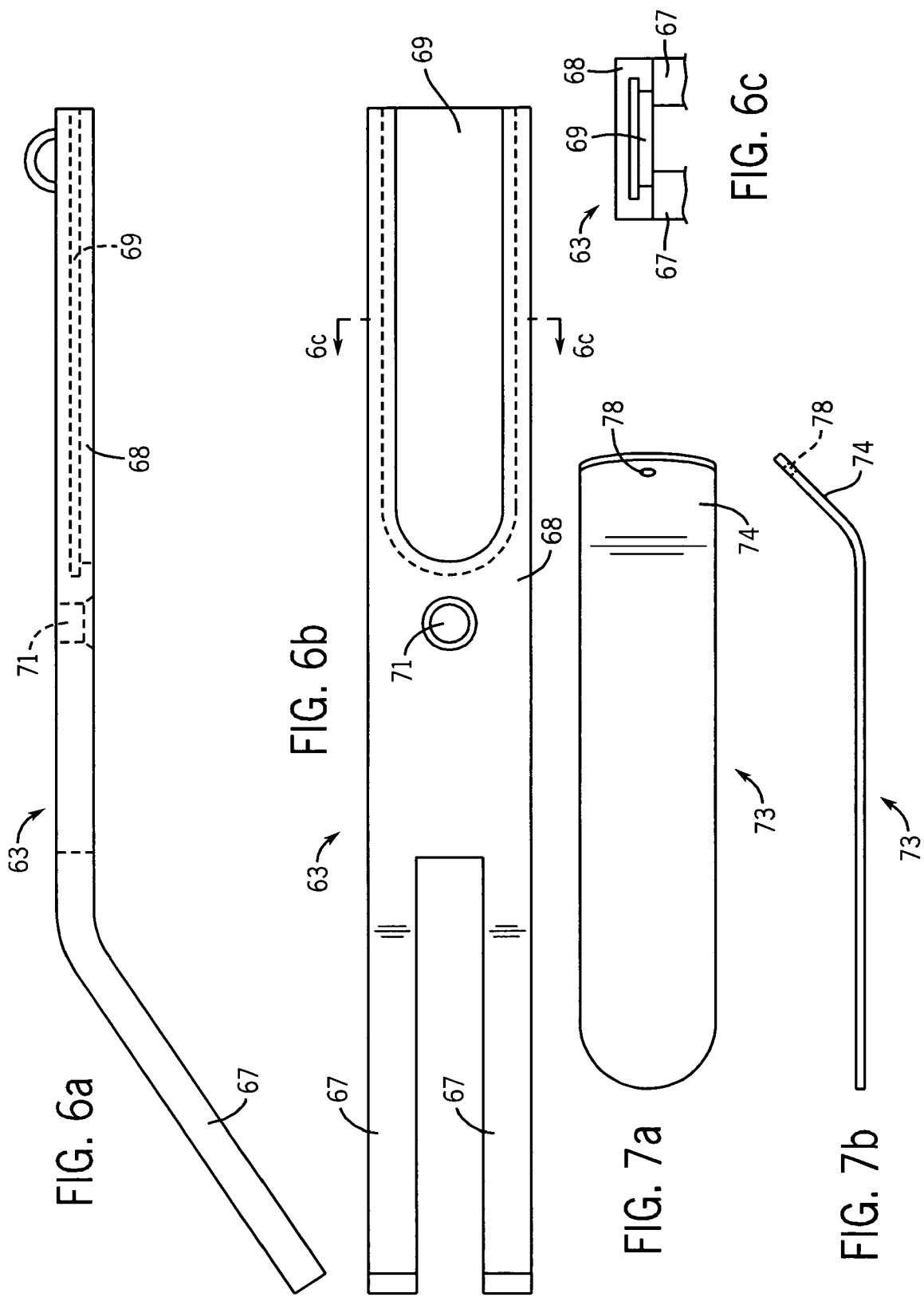

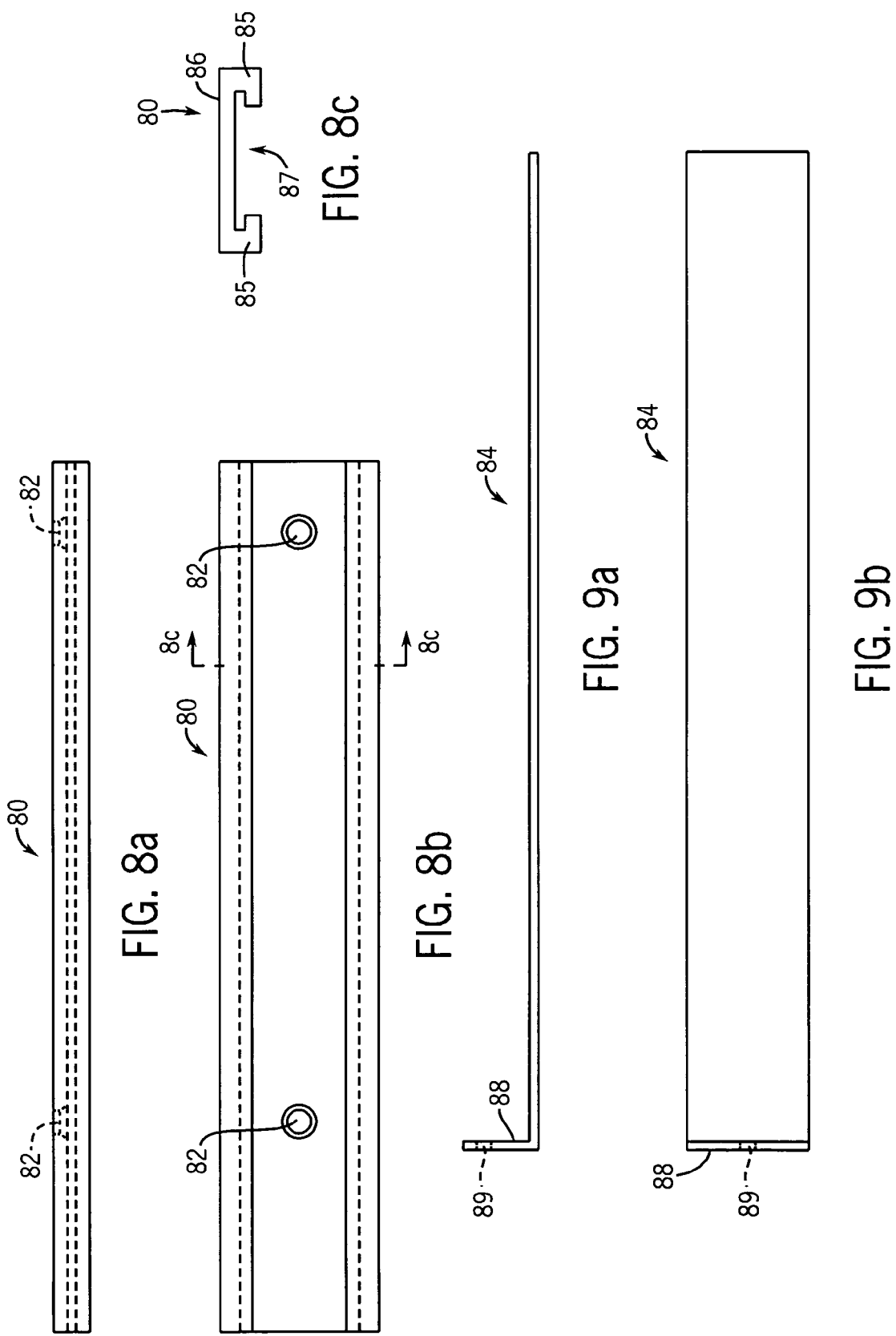

SAW GRINDING APPARATUS WITH IMPROVED WEAR PLATES

CROSS-REFERENCE TO RELATED APPLICATION

This application is based on and claims priority from U.S. Provisional Patent Application Ser. No. 60/507,380, filed on Sep. 30, 2003, which is incorporated herein by reference for all purposes.

BACKGROUND OF THE INVENTION

This invention pertains to improvements in apparatuses for sharpening the teeth of circular saws, and particularly to an apparatus that improves the overall effectiveness of a commonly used sharpening device that utilizes stationary wear plates.

Circular saw blades having replaceable teeth are as commonly used today in modern sawmills as they have been for many years in the commercial lumber industry. These saws come in varying sizes and require frequent maintenance in order to keep them effectively sharp and productive. Over the years, many devices have been used to sharpen the teeth of the saws. The most popular saw grinders typically employ a power-driven rotary grinding wheel mounted on a grinder carriage. Such devices are well known in the art; however, there have been no significant advances therein for some time. U.S. Pat. Nos. 2,249,743, 2,439,279, 2,651,219, 3,880,019, and 4,711,142 each relate to hand-held, motor driven saw blade sharpeners. Of these devices, only the grinder disclosed in U.S. Pat. No. 2,249,743 and the improvements thereto are readily available and commonly used in the industry today. The most popular of these improvements is a saw sharpener referred to as the "Jockey Grinder," produced by Hanchett Manufacturing in Big Rapids, Mich.

In general, as shown in FIGS. 1 and 2, a conventional saw grinder 10 includes a two-piece carriage 12, formed of a front panel 17 and a back panel 19. The back panel 19 is shown partially in phantom in FIG. 2. Front panel 17 and back panel 19 are bolted together by threaded fasteners 18, thereby capturing therebetween and supporting a handle 14 and a dividing block 16. The handle 14 connects to an adjustable mounting bracket 20 for mounting a motor to drive power-driven grinding wheel 24, shown in FIGS. 1 and 2 as an electric drill 22. A conventional front wear plate 30 is attached to the underside of the dividing block 16 using threaded fasteners passing through recessed aperture 37 (FIGS. 3a and 3b) into a corresponding hole (not shown) machined in the underside of the dividing block 16. Similarly, a conventional back wear plate 32 is attached to the underside of the handle 14 using threaded fasteners passing through recessed apertures 52 (FIGS. 4a and 4b) into corresponding holes (not shown) in the underside of the handle 14.

When in use, the entire weight of the saw grinder 10 rests on the stationary wear plates 30, 32 on the peripheral edge of the circular saw blade 28 consisting mainly of a plurality of replaceable teeth 26. The process of grinding the teeth 26 is initiated when the operator, or sawyer, positions the grinding wheel 24 under the tooth 26 by lifting the handle 14 and maneuvering the saw grinder 10 into an arcuate slot referred to as the gullet 33. The sawyer then sets the saw grinder 10 in the starting position shown in FIGS. 1 and 2, with the front and back wear plates 30, 32 now in contact with the peripheral edge of the saw blade 28. Using the handle 14 again, the sawyer eases the saw grinder 10 in the backward direction shown by arrow 36 to engage the bottom cutting edge of the tooth 26. The sawyer then moves the device 10 in the forward direction indicated by arrow 40 in order to remove the grinding wheel 24 from contact with the tooth 26. This process is repeated until the tooth 26 is properly sharpened. When the sawyer is satisfied with the results, the device 10 is lifted up to remove the grinding wheel 24 from the gullet 33, and positioned in a similar manner under the subsequent tooth 26, which may be found in either direction (36 or 40).

Referring now to FIGS. 3a and 3b, a conventional front wear plate 30 is shown in various views. The front wear plate 30 is substantially rectangular in shape, and includes a set of legs 44 extending outwardly from one end thereof. The legs 44 extend downwardly as shown in FIG. 3a. Through a recessed aperture 37, the front wear plate 30 is affixed with a screw into a corresponding hole that has been bored into the bottom of the dividing block 16 (shown in FIG. 2). FIGS. 4a and 4b show the conventional back wear plate 32 which contains an angled portion 49 suited to fit around the bottom of the handle 14 (shown in FIG. 2). The back wear plate 32 contains a set of recessed apertures 52 that are used to attach the wear plate 32 to the bottom side of the handle 14 (shown in FIG. 2).

A problem with the prior art saw grinders, particularly with reference to the Jockey Grinder as described above, resides in the fact that the reciprocating forward and backward movement necessary to properly sharpen the saw causes the stationary wear plates to scrape against the top surface of the teeth. The friction resistance between the teeth and the wear plates must be overcome in order to move the saw grinder, and creates divots, grooves and other irregularities in the wear plates, often causing the teeth to momentarily "stick" into the wear plates. The irregularities created over time can be substantial, and increase the friction resistance that must be overcome to move the saw grinder. Having to overcome this friction resistance poses major problems for sawyers charged with properly positioning the grinder relative to the tooth to be ground. For instance, a sawyer or grinder operator must gently feather the grinder back and forth to effectively sharpen an individual tooth. This motion must be fluid. Any interruption in the sawyer's grinding motion raises the risk that a tooth will be chipped, cracked or weakened ("blued") by unnecessary contact with the grinder wheel. Such problems are frequently encountered with the use of conventional saw grinders such as the Jockey Grinder, and lead to increased costs associated with the replacement of deformed wear plates and broken or weakened teeth. In addition, there is substantial down time associated with replacing damaged teeth, resulting in considerable production inefficiencies.

Accordingly there is a need for an improved saw grinding apparatus for allowing the saw grinder to easily move without having to overcome the friction resistance between the saw grinder wear plates and the peripheral edge of the saw blade. The present invention relates to improvements over the saw grinders described above, and to solutions to the problems raised or not solved thereby.

BRIEF SUMMARY OF THE INVENTION

The present invention provides a saw grinder comprising a carriage, a mounting assembly supported by the carriage, a dividing block supported by the carriage, a power-driven grinding wheel mounted on the mounting assembly, a front wear plate assembly and a back wear plate assembly. The front wear plate assembly has at least a first front plate and a second front plate. The front wear plate assembly is mounted so as to allow relative movement between the first and second front plates. The first front plate is substantially fixed relative to a saw grinder when the saw grinder is in use, and the second front plate is fixed relative to the carriage. Likewise, the back wear plate assembly has at least a first back plate and a second back plate. The back wear plate assembly is mounted so as to allow relative movement between the first and second back plates. The first back plate is substantially fixed relative to a saw blade when the saw grinder is in use, and the second back plate is fixed relative to the carriage.

The saw grinder of the present invention further ideally comprises a front resilient member to control the relative movement between the first front plate and the second front plate, and a back resilient member to control the relative movement between the first back plate and the second back plate. Other means for controlling the relative movement between the first front plate and the second front plate could also be employed.

The present invention further contemplates a method for using a saw grinder with improved wear plates. The method comprises the steps of (a) providing a saw grinder according to the present invention, (b) mounting the saw grinder on the saw blade so that the first front plate and the first back plate contact the saw blade to support the saw grinder on the saw blade, and (c) sliding the second front plate and the second back plate over the first front plate and the first back plate, respectively, as the carriage moves forward and backward.

Various objects and advantages of the present invention will become apparent to those skilled in the art from the detailed description, claims, and accompanying drawings.

BRIEF DESCRIPTION OF THE DRAWINGS

FIG. 6a is side elevational view of the fixed plate of the improved front wear plate assembly constructed according to a preferred embodiment of the invention;

FIG. 6b is a bottom plan view of the fixed plate of the improved front wear plate assembly shown in FIG. 6a;

FIG. 6c is a cross-sectional view of a segment of the T-slot of the fixed plate, taken along line 6c—6c of FIG. 6b;

FIG. 7a is side elevational view of the slide plate of the improved front wear plate assembly constructed according to a preferred embodiment of the invention;

FIG. 7b is a top plan view of the slide plate of the improved front wear plate assembly shown in FIG. 7a;

FIG. 8a is a side elevational view of the fixed plate of the improved back wear plate assembly constructed according to a preferred embodiment of the invention;

FIG. 8b is a bottom plan view of the fixed plate of the improved back wear plate assembly shown in FIG. 8a;

FIG. 8c is a cross-sectional view of the fixed plate of the improved back wear plate assembly taken along line 8c—8c of FIG. 8b;

FIG. 9a is side elevational view of the slide plate of the improved back wear plate assembly constructed according to a preferred embodiment of the invention; and FIG. 9b is a top plan view of the slide plate of the improved back wear plate assembly shown in FIG. 9a.

DETAILED DESCRIPTION OF THE INVENTION

Figure 1:
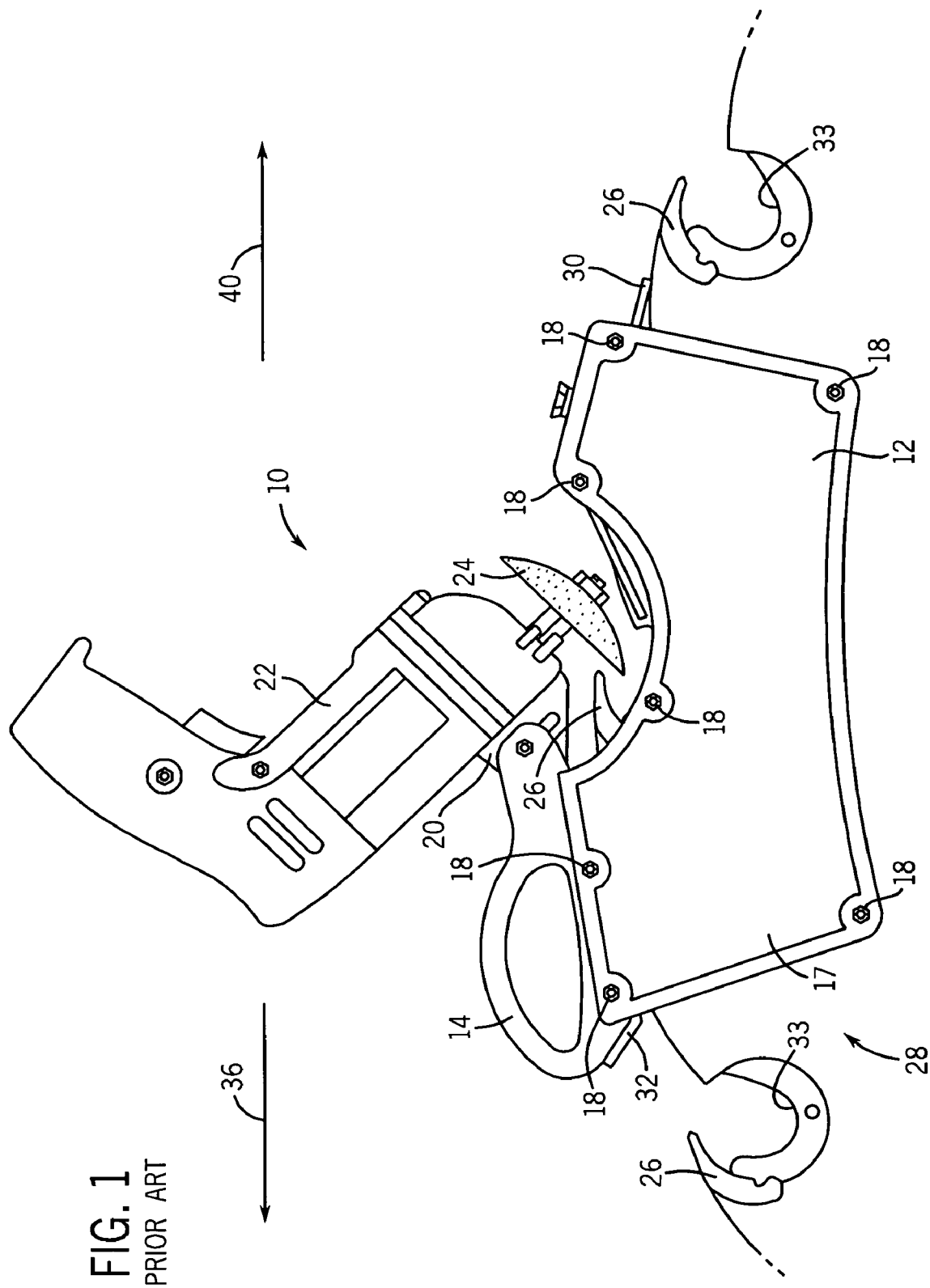
FIG. 1 is a side elevational view of the conventional saw grinder with both panels applied to the saw.
Figure 2:
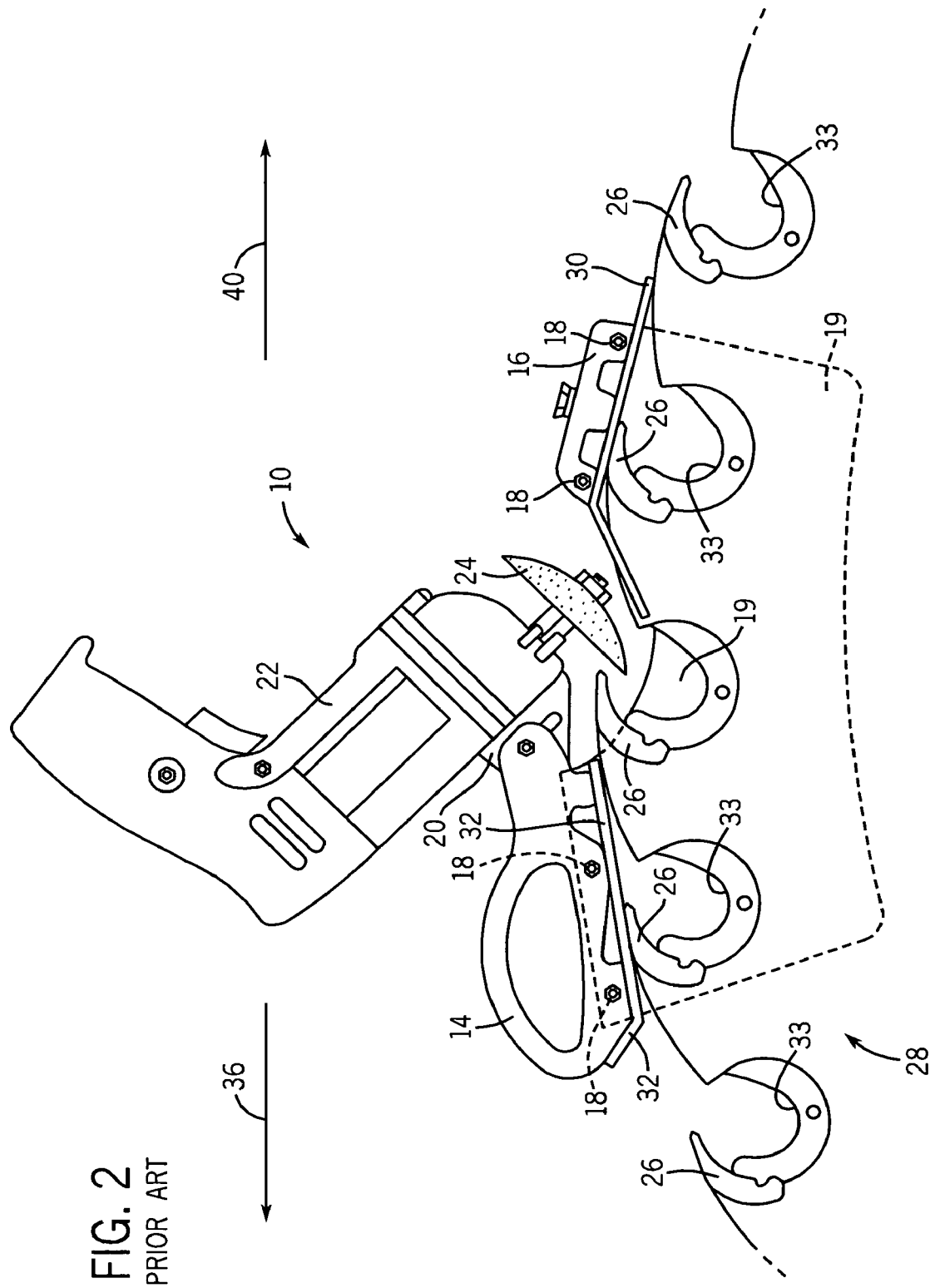
FIG. 2 is side elevational view of the conventional saw grinder with the front panel removed.
Figure 3A:
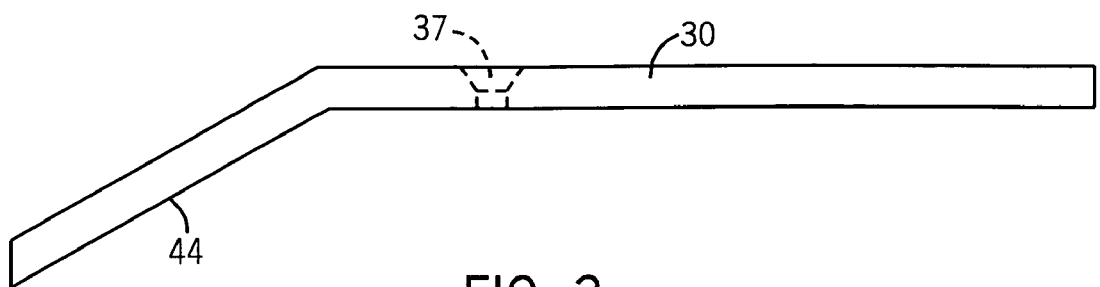
FIG. 3a is side elevational view of the front wear plate of the conventional saw grinder shown in FIG. 1.
Figure 3B:
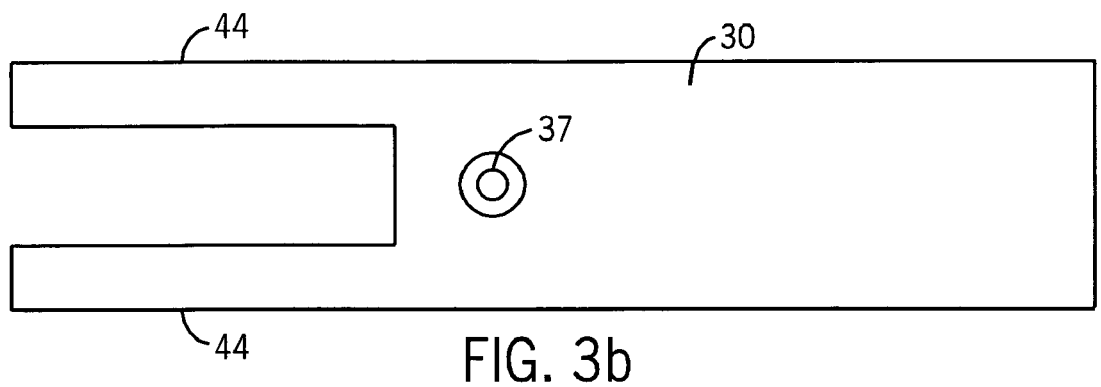
FIG. 3b is a top plan view of the front wear plate of the conventional saw grinder shown in FIG. 1.
Figure 4A:
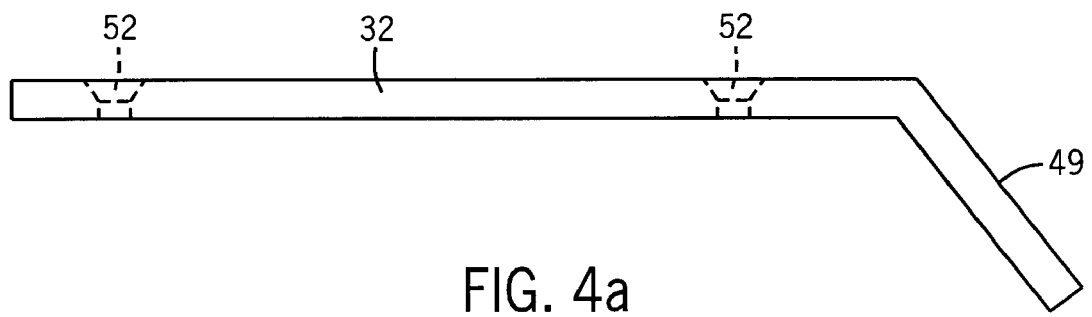
FIG. 4a is side elevational view of the back wear plate of the conventional saw grinder shown in FIG. 1.
Figure 4B:
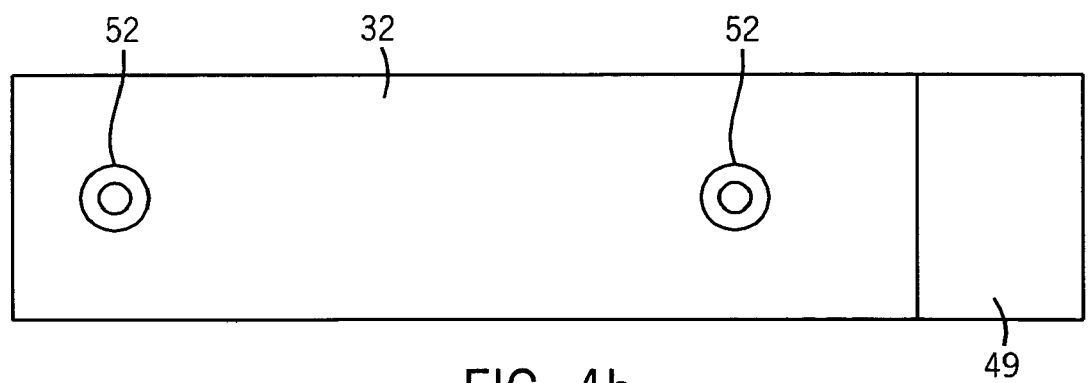
FIG. 4b is a top plan view of the back wear plate of the conventional saw grinder shown in FIG. 1.
Figure 5:
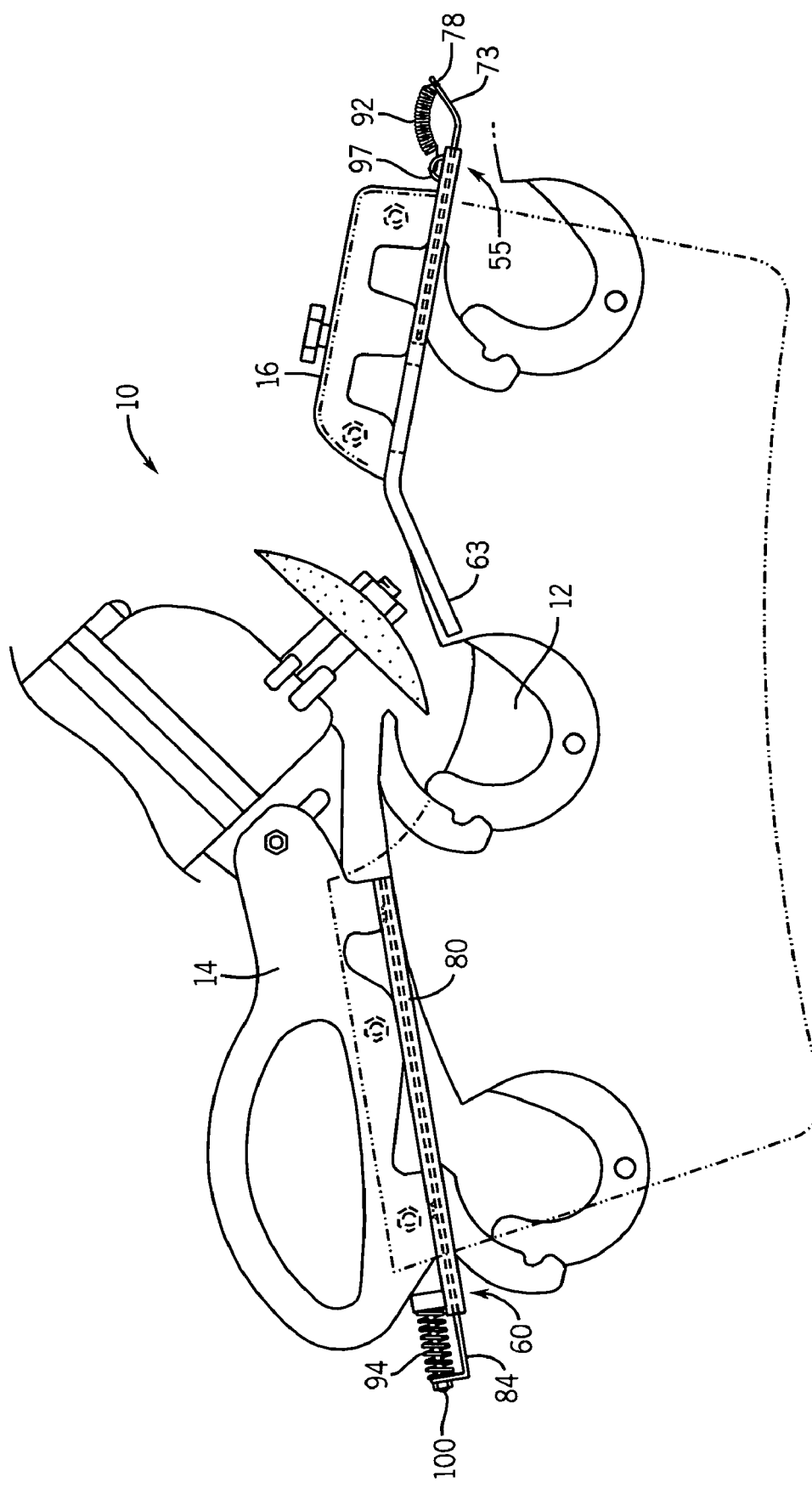
FIG. 5 is a side elevational view of the saw grinder with improved wear plates constructed according to a preferred embodiment of the invention, shown with the front panel removed.

Referring again to the drawings, the present invention includes a carriage 12, formed in part of a front panel 17 and a back panel 19. Also, the front panel 17 and back panel 19 are bolted together by threaded fasteners 18, capturing therebetween and supporting a handle 14 and a dividing block 16, and the handle 14 connects to an adjustable mounting bracket 20 for supporting a motor such as an electric drill 22. To that extent the present invention is similar to the conventional device referred to above in connection with FIGS. 1 through 4. In FIG. 5, showing a preferred embodiment of the present invention, the front panel 17 has been removed for clarity of illustration and the back panel 19 is shown partially in phantom, as hidden behind a portion of the circular saw blade 28. Instead of a handle 14 and a mounting bracket 20, the present invention could employ other mounting assembly configurations to support the motor on the saw grinder, including a single mounting apparatus that does not include a handle. Instead of a conventional front wear plate and a conventional back wear plate, the present invention provides a pair of improved wear plate assemblies, a front wear plate assembly 55 and a rear wear plate assembly 60, as illustrated in FIG. 5.

The front wear plate assembly includes a front fixed plate 63 and a front slide plate 73. The front fixed plate 63 is shown connected to the underside of the dividing block 16, but could be connected at any location that fixes the front fixed plate relative to the carriage so that the front fixed plate will move therewith. The front fixed plate 63 is preferably connected to the dividing block 16 by threading screws or other removable fastening devices through recessed aperture 71, depicted most clearly in FIGS. 6a and 6b, and into holes (not shown) in the underside of the dividing block. The front slide plate 73 is mounted and assembled with the front fixed plate 63 in a manner so that the front slide plate 73 is able to move longitudinally relative to the front fixed plate 63. Most preferably, the front slide plate 73 is mounted at least partially within a slot 69 formed in the front fixed plate 63, as shown in FIGS. 6a—6c, although other ways of permitting slideable movement are also contemplated. A front resilient member, preferably a front spring 92 as shown in FIG. 5, is used to control the relative movement of the front slide plate 73. Other types of resilient members, such as but not limited to an elastic band formed from rubber or other elastic material, could also be used to provide control to the movement of the front slide plate. In the preferred embodiment, front spring 92 is attached to the front slide plate 73 via aperture 78 shown in FIGS. 7a and 7b and is attached to the fixed slide plate 63 via ring 97.

Similarly, the back wear plate assembly 60 includes a back fixed plate 80 and a back slide plate 84. The back fixed plate 80 is shown connected to the underside of the handle 14, but could be connected to any mounting assembly used, or to any location that fixes the back fixed plate relative to the carriage so that the back fixed plate will move therewith. The back fixed plate 80 is preferably connected to the handle 14 by threading screws or other removable fastening devices through recessed apertures 82, depicted most clearly in FIGS. 8a and 8b, and into holes (not shown) in the underside of the handle 14. The back slide plate 84 is mounted and assembled with the back fixed plate 80 in a manner so that the back slide plate 84 is able to move longitudinally relative to the back fixed plate 80. Most preferably, the back fixed plate 80 is mounted at least partially within a slot 87 formed in the back fixed plate 80, as shown in FIGS. 8a—8c, although other ways of permitting slideable movement are also contemplated. A back resilient member, preferably a back spring 94 as shown in FIG. 5, is used to control the relative movement of the back slide plate 84. Other types of resilient members, such as but not limited to a compression member formed from rubber or other elastic material, could also be used to provide control to the movement of the back slide plate 84. In the preferred embodiment, back spring 94 is positioned around a stop pin 100 that is mounted to the fixed plate 80 and projected through an aperture 78 of the slide plate 84.

The front wear plate assembly 55 is shown in more detail in FIGS. 6a–7b. Specifically, FIGS. 6a—6c show several views of an embodiment of the fixed plate 63 having a substantially rectangular body 68, with a set of downwardly-angled legs 67 projecting off one end of the body, a recessed aperture 71 formed through the body proximal to where the legs connect to the body, and a T-slot 69 formed within the body 68. The preferred width of the fixed plate 63 should be roughly ¾ in. (0.75 in.); however other dimensions can be used. FIGS. 7a and 7b show an embodiment of the slide plate 73 which is essentially a flat member having an angled end 74 and an aperture 78 located in a section of the angled end 74. The slide plate 73 engages or slides into the T-slot 69 of the fixed plate 63, which allows for relative movement between the front fixed plate 63 and the front slide plate 73. In particular, slide plate 73 can slide relative to fixed plate 63, and vice versa. The T-slot 69 of the fixed plate 63 forms a recess in which the slide plate 74 can freely move in either direction along the length of the T-slot 69. Although the front plate assembly 55 is shown in the above-described configuration, such does not operate to limit the invention. Other configurations that allow relative movement between at least a first front plate and a second front plate in a front wear plate assembly could also be used. For instance, a pair of bracketing arms or other types of recesses may be employed to provide a relative movement area between the plates.

The back plate assembly 60 is shown in more detail in FIGS. 8a–9b. As illustrated in FIGS. 8a–8c, the back plate assembly 60 preferably includes a fixed plate 80 having a substantially rectangular body 86 with arms 85 forming a T-slot 87 to receive the slide plate 84. The fixed plate 80 also contains a set of recessed apertures 82. In FIGS. 9a and 9b, the slide plate 84 is shown to have a substantially flat shape with an angled end 88 and an aperture 89 formed generally centrally on the angled end 88. A cross-sectional view of the bracketing arms 85 is provided in FIG. 8c. Like the T-slot 69 of the front fixed plate 63, the T-slot 87 of the back fixed plate 80 provides a relative movement area for the slide plate 84. According the embodiment shown, the slide plate 84 is mounted at least partially in the T-slot 87 and may freely move, or slide, in either longitudinal direction along the length of the fixed plate 80. Again, other configurations may be employed to permit the relative movement characteristics of at least a first and second back plate of the back plate assembly 60, including but not limited to the use of bracketing arms or other recesses.

When in use, the saw grinder of the present invention is mounted on a saw blade so that the front and back slide plates 73, 84 are in contact the peripheral edge of the saw blade, which consists primarily of replaceable teeth, to support the grinder on the saw blade. The front and back fixed plates 63, 80 are not in contact with the peripheral edge or replaceable teeth of the saw blade. As the sawyer begins to sharpen a tooth on the saw blade, the carriage is moved in forward and backward directions (as indicated by arrows 40, 36 in FIG. 1). As the carriage so moves, the front and back fixed plates 63, 80 move with the carriage, but the friction resistance between the front and back slide plates 73, 84 and the peripheral edge of the saw blade allow the front and back slide plates 73, 84 to stay substantially fixed relative to the peripheral edge of the saw blade.

As the fixed plates move relative to the slide plates, the front and back resilient members control the relative movement. Both the front and back resilient members add a controlled amount of resistance to the relative movement, which helps facilitate the fluid, precise movement required to accurately sharpen the tooth. This resistance is a much smaller amount of resistance than that provided by the friction between the slide plates and the peripheral edge of the saw blade. From their respective starting positions shown in FIG. 5, the front resilient member, spring 92, is extended and the back resilient member, spring 94, is compressed as the saw grinder moves in a backward direction. In the embodiment shown, the front spring 92 is never compressed past its starting position, and the back spring 94 is never extended past its starting position. Spring 92 also ensures that the slide plate 73 cannot slide out of the slot 69 in the front fixed plate 63, and further ensures that the front slide plate 73 is returned to its starting position as shown in FIG. 5 when the saw grinder is moved from one sharpening location to the next. The back spring 94 also operates to ensure that the slide plate 84 is returned to its starting position as shown in FIG. 5 when the saw grinder is moved from one sharpening location to the next. Stop pin 100 ensures that back spring 94 does not push the back slide plate 84 out of the slot 87.

Although controlling the relative movement between the fixed plates and slide plates is desirable and ideal, it is not required by the present invention. In addition, ensuring that the slide plates do not slide out of the T-slots, and that the slide plates return to their starting positions when the saw grinder is moved from one sharpening location to the next, is also ideal but not necessary. Thus, the resilient members are not necessary. Without the back resilient member, the stop pin is also not necessary. Further, other means for controlling the relative movement between the fixed plates and the slide plates, besides front and back resilient members, could also be employed. For example, a stop pin or other mechanical stopping device could be employed on each of the slide plates to ensure that the slide plates do not slide out of the T-slots. Alternatively, means for controlling the relative movement between the fixed plates and slide plates could be employed on only one of the front or back wear plate assemblies.

The preferred embodiment of the present invention described above permits the entire saw grinder, except for the slide plates, to move in the direction of the force applied to the handle. The slide plates engage and remain substantially fixed to the peripheral edge of the saw blade to support the saw grinder on the saw blade, while the fixed plates remain fixed relative to the carriage and thus move therewith. As the carriage moves in forward and backward directions, the fixed plates slide over the slide plates to move with the carriage. Again, other embodiments or configurations that allow relative movement, such as but not limited to sliding movement, between at least two plates in a wear plate assembly are contemplated by this invention. For example, the configuration shown in U.S. Provisional Patent Application No. 60/507,380, incorporated herein by reference for all purposes, could also be used. Relative movement between at least two plates allows the carriage and the saw grinder elements supported thereon to move without having to overcome the resistance created by contact between the wear plates and the peripheral edge of the saw blade, which in turn allows the sawyer to move the saw grinder in a more fluid motion and thereby reduces the risk of damage to the saw blade teeth.

While the invention has been described with reference to preferred embodiments, it is to be understood that the invention is not intended to be limited to the specific embodiments set forth above. It is recognized that those skilled in the art will appreciate certain substitutions, alterations, modifications, and omissions may be made without parting from the spirit or intent of the invention. Accordingly, the foregoing description is meant to be exemplary only, and the invention taken as including all reasonable equivalents to the subject matter of the invention. The only limit to the scope of the invention should be the following claims.

What is claimed is:

1. In a saw grinder comprising a carriage, a mounting assembly, a dividing block and a power-driven grinding wheel, the improvement comprising:
    a front wear plate assembly having a front slide plate and a front fixed plate, the front fixed plate fixed to the dividing block and containing a slot to slidably receive the front slide plate for allowing relative movement between the front fixed plate and the front slide plate, and the front slide plate substantially fixed relative to a peripheral edge of a saw blade when the saw grinder is in use;
    a back wear plate assembly having a back slide plate and a back fixed plate, the back fixed plate fixed to the mounting assembly and containing a slot to slidably receive the back slide plate for allowing relative movement between the back fixed plate and the back slide plate, and the back slide plate substantially fixed relative to a peripheral edge of a saw blade when the saw grinder is in use;
    at least one front resilient member for controlling the relative movement between the front fixed plate and the front slide plate; and
    at least one back resilient member for controlling the relative movement between the back fixed plate and the back slide plate.

2. The improvement of claim 1, wherein the front resilient member and the back resilient members are springs.

3. The improvement of claim 1, wherein the front resilient member and the back resilient member are made of rubber.

4. The improvement of claim 1, wherein the front resilient member is an elastic band.

5. The improvement of claim 1, wherein the back resilient member is a compression member.

6. The improvement of claim 1, wherein the back wear plate assembly includes a stop pin attached to the back fixed plate and projected through an aperture in the back slide plate.

7. The improvement of claim 1, wherein the front resilient member is attached to the front fixed plate and the front slide plate.

8. The improvement of claim 1, wherein the back resilient member is positioned around a stop pin attached to the back fixed plate and projected through an aperture in the back slide plate.

9. A saw grinder comprising:
    a carriage;
    a mounting assembly supported by the carriage;
    a dividing block supported by the carriage;
    a power-driven grinding wheel mounted on the mounting assembly;
    a front wear plate assembly having at least a first front plate and a second front plate, the front wear plate assembly mounted and assembled so as to allow relative movement between the first and second front plates, the first front plate substantially fixed relative to a saw blade when the saw grinder is in use, and the second front plate fixed relative to the carriage; and
    a back wear plate assembly having at least a first back plate and a second back plate, the back wear plate assembly mounted and assembled so as to allow relative movement between the first and second back plates, the first back plate substantially fixed relative to a saw blade when the saw grinder is in use, and the second back plate fixed relative to the carriage.

10. The saw grinder of claim 9, further comprising a front resilient member to control the relative movement between the first front plate and the second front plate.

11. The saw grinder of claim 9, further comprising a back resilient member to control the relative movement between the first back plate and the second back plate.

12. The saw grinder of claim 9, wherein the front wear plate assembly is attached to the dividing block.

13. The saw grinder of claim 9, wherein the back wear plate assembly is attached to the mounting assembly.

14. The saw grinder of claim 9, wherein the back wear plate assembly includes a stop pin attached to the second back plate and projected through an aperture in the first back plate.

15. The saw grinder of claim 9, wherein the second front plate slidably receives the first front plate.

16. The saw grinder of claim 9, wherein the second back plate slidably receives the first back plate.

17. The saw grinder of claim 9, wherein the second front plate includes a slot for slidably receiving the first front plate.

18. The saw grinder of claim 9, wherein the second back plate includes a slot for slidably receiving the first back plate.

19. The saw grinder of claim 9, further comprising means for controlling the relative movement between the first and second front plates and between the first and second back plates.

20. A method for using a saw grinder with improved wear plates, the method comprising:
    providing a saw grinder having (i) a carriage, (ii) a mounting assembly supported by the carriage, (iii) a dividing block supported by the carriage, (iv) a power-driven grinding wheel mounted on the mounting assembly, (v) a front wear plate assembly having at least a first front plate and a second front plate, the front wear plate assembly mounted and assembled so as to allow relative movement between the first and second front plates, the first front plate substantially fixed relative to a saw blade when the saw grinder is in use, and the second front plate fixed relative to the carriage, and (vi) a back wear plate assembly having at least a first back plate and a second back plate, the back wear plate assembly mounted and assembled so as to allow relative movement between the first and second back plates, the first back plate substantially fixed relative to a saw blade when the saw grinder is in use, and the second back plate fixed relative to the carriage;

mounting the saw grinder on the saw blade so that the first front plate and the first back plate contact the saw blade to support the saw grinder on the saw blade; and sliding the second front plate and the second back plate over the first front plate and the first back plate, respectively, as the carriage moves forward and backward.

* * * * *